(12) United States Patent
Berger et al.

(10) Patent No.: US 6,855,455 B1
(45) Date of Patent: Feb. 15, 2005

(54) ELECTRODE UNIT FOR RECHARGEABLE ELECTROCHEMICAL CELLS

(75) Inventors: Thomas Berger, Pfinztal (DE); Birgit Fuchs, Karlsruhe (DE); Angela Piepke, Metzingen (DE)

(73) Assignee: Fraunhofer-Gesellschaft zur Förderung der angewandten Forschung e.V., München (DE)

( * ) Notice: Subject to any disclaimer, the term of this patent is extended or adjusted under 35 U.S.C. 154(b) by 0 days.

(21) Appl. No.: 09/914,950

(22) PCT Filed: May 24, 2000

(86) PCT No.: PCT/EP00/04733

§ 371 (c)(1),
(2), (4) Date: May 7, 2002

(87) PCT Pub. No.: WO00/74156

PCT Pub. Date: Dec. 7, 2000

(30) Foreign Application Priority Data

May 26, 1999 (DE) .......................................... 199 24 137

(51) Int. Cl.$^7$ ............................ H01M 2/16; H01M 2/18
(52) U.S. Cl. ........................ 429/138; 429/131; 429/132; 429/139; 429/143; 429/246
(58) Field of Search .......................... 429/66, 130–132, 429/146, 136–139, 142–144, 246

(56) References Cited

U.S. PATENT DOCUMENTS

| | | | |
|---|---|---|---|
| 3,201,280 A | | 8/1965 | Yumoto |
| 3,862,862 A | * | 1/1975 | Gillibrand et al. ............ 427/58 |
| 3,876,470 A | * | 4/1975 | McBreen ..................... 429/229 |
| 4,396,689 A | | 8/1983 | Grimes |
| 6,051,038 A | * | 4/2000 | Howard et al. ............ 29/623.1 |
| 6,207,316 B1 | * | 3/2001 | Pauling ....................... 429/132 |
| 6,387,564 B1 | * | 5/2002 | Yamashita et al. .......... 429/132 |

FOREIGN PATENT DOCUMENTS

| | | | |
|---|---|---|---|
| DE | 17 71 185 | 12/1971 | |
| DE | 24 15 076 | 10/1974 | |
| DE | 24 54 824 | 5/1975 | |
| DE | 25 46 972 | 4/1977 | |
| DE | 197 08 209 | 9/1998 | |
| EP | 07 66 326 | 4/1997 | |
| WO | WO 98/38686 | * 9/1998 | ............ H01M/4/24 |

* cited by examiner

*Primary Examiner*—Patrick Ryan
*Assistant Examiner*—Tracy Dove
(74) *Attorney, Agent, or Firm*—Paul Vincent

(57) ABSTRACT

The invention relates to an electrode unit for rechargeable electrochemical cells, e.g. accumulator cells, whose energy storage properties are drawn from the deposition of an element such as metal or an alloy. The electrode unit has an electrode (2) and a porous separator (5a) nearly completely surrounding said electrode, wherein an electrically insulating spacer (3) covering at least one face of the electrode is disposed between the electrode and the separator. The spacer according to the invention makes it possible to provide the necessary space for the metal or alloy deposited on the electrode, particularly during charging of the accumulator cell. The mechanical pressure as a result of changes in the volume of the electrode due to the deposited metal or alloy are intercepted, thereby reliably preventing short circuits.

25 Claims, 2 Drawing Sheets

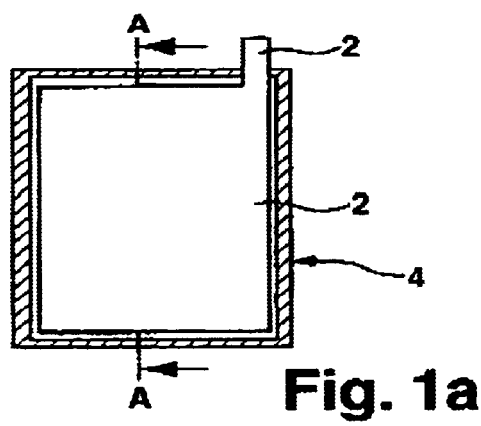
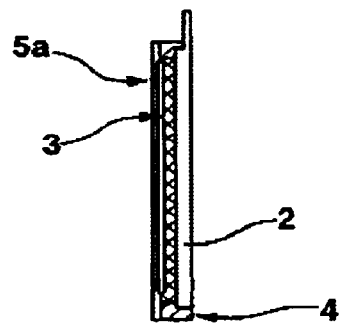
Fig. 1a  Fig. 1b
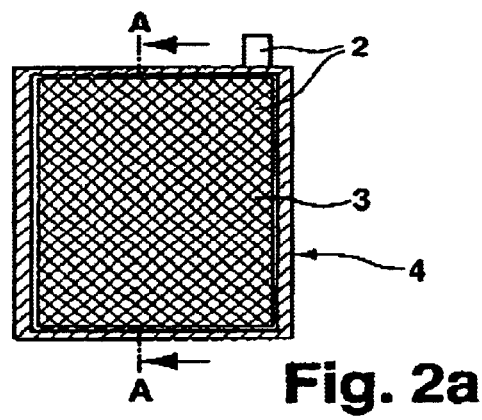
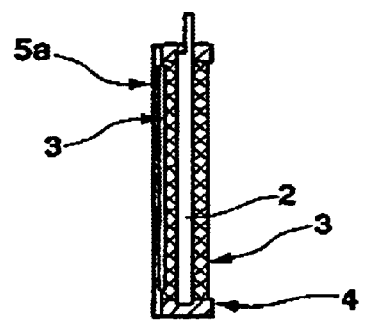
Fig. 2a  Fig. 2b
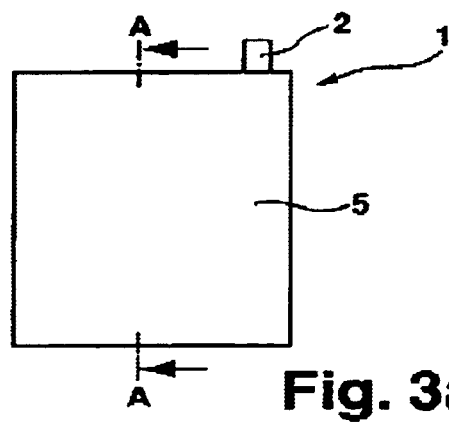
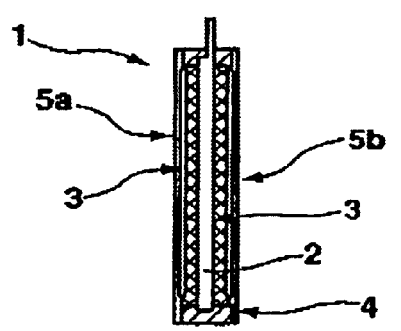
Fig. 3a  Fig. 3b

ELECTRODE UNIT FOR RECHARGEABLE ELECTROCHEMICAL CELLS

BACKGROUND OF THE INVENTION

The invention concerns an electrode unit for rechargeable electrochemical cells, e.g. accumulator cells, whose energy storage properties are drawn from the deposition of an element such as metal or an alloy, and a rechargeable electrochemical cell equipped with at least one such electrode unit.

Electrochemical cells are current cells which can convert chemical energy into electric energy. If such a conversion is reversible, i.e. if such an electrochemical cell can be recharged by a current opposite to the discharge current, then this cell is called an accumulator cell.

Rechargeable electrochemical cells (accumulator cells) which draw their energy storage properties from deposition of an element as a metal or an alloy, differ from conventional accumulator cells in that the mass storing negative electrochemical energy is deposited on the negative electrode during charging of the cells. In contrast thereto, in conventional cells, e.g. Ni/Cd or Pb/PbO$_2$, a substance is provided in the negative electrode which is chemically converted during charging and transferred into a higher energetic state to thereby store energy.

The principle of a rechargeable electrochemical cell which gains its energy storage properties from deposition of an element as a metal or an alloy is illustrated below with the example of a LiCoO$_2$ cell.

The rechargeable electrochemical cell is assembled in the discharged state and consists, at this time, of an electrode which is positive during charging and contains LiCoO$_2$ as electrochemically active intercalation material. The entire lithium is in the positive electrode. The electrode which is negative during charging consists initially of a current collector comprising a discharge conductor which may e.g. consist of nickel sheet metal or another electron-conducting material. The positive and negative electrodes are segregated by a separator. The continuous pore matrix of the separator and all remaining spaces between the LiCoO$_2$ crystallites and the current collector of the negative electrode are filled with an electrolyte which conducts Li ions. During charging, some of the CO$^{3+}$, ions are oxidized in the LiCoO$_2$ into Co$^{4+}$ ions, i.e. electrons are discharged to the current collector of the positive electrode. Same are transported through an external electron conductor (charging device) to the negative electrode. At the same time, for charge compensation, Li$^+$ ions are deintercalated in the LiCoO$_2$ crystallite, i.e. the lithium ions leave the crystal grid and move through the electrolyte towards the negative electrode where they are deposited in metallic form on the current collector while accepting one electron each. Alternatively, this process can be carried out by forming an alloy if the current collector consists of an alloy-forming material. In both cases, during metallic deposition and formation of alloys, larger volume increase occurs on the side of the negative electrode. The deposition (deintercalation) of the lithium ions also produces a volume increase at the positive electrode.

The terminology for utilization of electric energy refers to the "utilization process" as the discharging process of a battery or an accumulator. The positive electrode is thereby referred to as the cathode, and the negative electrode as the anode. Discussion herein mainly concerns the charging process, wherein oxidation or reduction of the electrodes are reversed compared to the discharge process. During charging, the anode is the positive electrode of intercalation material and the cathode is the negative electrode where metal is deposited or an alloy is formed during charging. Since the charging process is primarily discussed below, the positive electrode is the anode and the negative electrode is the cathode.

Storage of electric energy through deposition of a light element (e.g. lithium) or formation of specific light alloys (e.g. LiAl) entails high gravimetric energy densities of the negative electrode which produces, however, large volume changes of the negative electrode during charging or discharging.

The volume work on the cathode side and therefore the mechanical pressure on a separator, usually disposed between anode and cathode, and on the battery housing is produced through deposition of the metal or through formation of alloys with the metal of the electrode of the current collector. This occurs primarily at the edges of the electrode, having the highest current density.

The metal is often deposited in the form of fine needles (dendrites or whiskers) and therefore has a sponge-like morphology. Consequently, much more space is required than that theoretically calculated. The dendritic deposition on the negative electrode (cathode) may cause a short-circuit as soon as it develops around or through the separator disposed between the electrodes, or the separator can no longer withstand the mechanical load.

On the side of the positive electrode (anode), the use of intercalation materials during dislocation (deintercalation) of the metal ions weakens the overall binding of the ions in the host grid which usually also increases the volume.

Usually, units having a positive electrode/separator/negative electrode are produced and combined, in dependence on the requirements, to form the battery. For prismatic cells, several units are stacked on top of one another and each of the current dischargers of the anodes and cathodes are connected. For round cells, an elongated unit is rolled-up. These packets or stacks are then disposed in a housing which should tightly hold the packet to prevent displacement of the electrodes with respect to one another and the inherent risk of a short-circuit. When filling the electrolyte, penetration of the electrolyte into the pores of the battery component, which optionally swell, produces high pressures and the positive electrode firmly abuts the separator which, in turn, firmly abuts the negative electrode.

In conventional systems without considerable volume change during electrochemical activity, this is a desired effect. In the relevant systems showing large volume changes, this construction can cause a short-circuit when either the separator cannot withstand the mechanical load and breaks, or when the metal deposited e.g. in the form of dendrites or whiskers or the alloy formed on the side of the cathode grows through the separator and/or when the deposited metal or formed alloy develops around the separator from the electrode edge to pass from the anode to the cathode. In any case, such a volume change can cause deformation of the battery housing.

EP 0 766 326 A1 describes an electrode unit of the kind categorizing the invention comprising a ceramic or glassy substance disposed onto the electrode surface and formed by annealing into a continuous fine-pored separator layer.

Disadvantageously, when charging an accumulator cell provided with such electrodes, the mass deposited on the negative electrode can penetrate through the porous separator and cause a short-circuit. Moreover, deposition of the mass during charging of the accumulator cell entails a considerable volume increase of the electrode such that in an electrode unit of this design, there is the danger of failure of the separator and/or deformation of the accumulator housing.

It is therefore the underlying purpose of the present invention to further develop an electrode unit of the above-mentioned type such that the mechanical pressure produced by the volume change of the electrodes is accommodated and short-circuits are reliably prevented.

To achieve this object, the invention provides an electrode unit of the above-mentioned type having an electrode whose volume increases during charging through metal deposition or alloy formation, comprising a porous separator substantially completely surrounding the electrode, and an electrically insulating spacer which covers at least part of the electrode surface and has spaces accommodating the volume increase.

SUMMARY OF THE INVENTION

In accordance with the invention, the electrically insulating spacer which covers part of the electrode surface provides the required space for the metal or alloy deposited on the cathode, in particular, during charging of the accumulator cell, and also for the volume increase during deintercalation at the positive electrode, and avoids the mechanical pressure build-up otherwise caused by the volume changes occurring during electrochemical reactions of the battery system. In this fashion, the inventive spacer prevents short-circuits from excessive mechanical loading of the separators disposed between the electrodes. One single spacer is often sufficient, preferably for the negative electrode of the a rechargeable electrochemical cell.

In a preferred embodiment, the spacer is designed such that the metal to be deposited or the formed alloy is provided with exactly enough space on the electrode surface that the sponge-like structures which may occur during the charging process are compressed such that a compact deposition remains following the charging process. A spacer of this type is preferably designed as a fabric, texture, grid, net, perforated foil or the like, or the spacer comprises burls or in has a porous or foamy structure. In this fashion, the deposited metal or deposited alloy is strictly channeled in its direction of growth. The spacer consists of an electrically insulating material and therefore metal is only deposited on electrode surfaces which are not covered by the spacer, preferably in compressed form.

The spacer preferably covers between 5% and 30% of at least one surface of the electrode.

A preferred embodiment provides that the spacer covers and electrically insulates the outer edges of the electrode, wherein the spacer comprises e.g. a frame which covers and electrically insulates the outer edges of the electrode. In this fashion, when the volume changes due to metal deposition or alloy formation on the electrode, the edges of the electrode are covered by the insulating material of the frame. Since the field line density increases at the edges and corners of a metallic carrier disposed in an electric field, the metal or alloy is preferably deposited at the edges and corners of the electrode during charging of the accumulator cell which leads to accumulation of mass at these exposed locations and to an increased pressure on the separator at these locations. If the separator is relatively small, dendrites or whiskers may grow around the separator which causes an unavoidable short-circuit. This is counteracted by the spacer, covering the electrode edges, or the frame in a simple and effective fashion thereby preventing formation of higher current densities at the electrode edge and increased deposition or formation of alloys, wherein there is no increased risk of a short circuit. If the electrode edge is not completely covered by the geometry of the spacer, it is possible to additionally dispose such a frame to cover the electrode edges.

Like the optional frame, the spacer is made from any electrically insulating material, e.g. plastic, ceramic, glass or the like or of composites of such materials.

To optimally prevent a short circuit, a porous separator is provided which is preferably shaped as a substantially completely closed bag, such that the electrode provided with the spacer is accommodated in the separator bag and preferably closed on all sides to reliably prevent covering of the separator and/or spacer with deposited metal or formed alloy. In this fashion, the entire electrode plate and the spacer partly covering it is covered by the insulating porous separator such that a conducting connection between anode and cathode cannot be produced by metal deposited on the cathode during charging to thereby prevent short circuits. The inventive spacer whose structure preferably ensures localized and compact deposition of the metal furthermore ensures that the volume change of the cathode during charging of the electrochemical cells is taken into account thereby minimizing the mechanical load on the separator and on the battery housing. The term "porous" refers, in particular, to porosities having suitable permeability for the respective electrolyte used in the electrochemical cell.

As mentioned above, although the use of pocketed electrodes in conventional accumulator cells is known, their function is, however, limited to retaining the active mass released during electrochemical activity of the electrode. Such electrodes are used mainly in $Pb/PbO_2$ accumulators.

In a preferred embodiment, the separator consists of a sheet or diaphragm. In particular, for plate-shaped electrodes, the separator may comprise two sheets or diaphragms of substantially equal size which can be connected to one another about the circumference of the electrode though welding, gluing or the like. Diaphragms are preferably connected by welding, gluing or the like about substantially the entire circumference of the electrode. In many cases it may be sufficient to design the separator to be open at the top, wherein punched locations may be provided for discharging the gases from the separator which might be produced by the chemical reactions during the charging and discharging processes. The electrodes at the edges of the electrochemical cell may be provided with a separator only on their side facing the neighboring electrode, while the side facing the wall of the electrochemical cell may comprise e.g. an insulating sheet, e.g. made from a thermoplastic synthetic material, such as polypropylene.

The separator is preferably made from a plastic which can be wetted by the subject electrolyte, preferably thermoplastic or weldable plastics, such as polyolefines (polyethylene, polypropylene etc.). The separator may also consist of ceramic-coated carrier materials, ceramics or composites of the above mentioned materials.

The spacer can be loosely introduced between the electrode and the separator but can also be rigidly connected with the electrode and/or the separator through welding, gluing, coating or the like.

The electrode and spacer can be one integral piece or the electrode itself can be configured as a spacer. The function of the spacer can be achieved through a burled, gridded, netted, honeycombed, corrugated or similar structure, at least on the outer side of the electrode. Alternatively or additionally, sponge-like or foam-like structures are possible. The elevations of such structures assume the function of the spacer. The elevations of the surface structure of the electrode forming the spacer must be provided with an electrically insulating coating, e.g. with a ceramic layer or a plastic layer, to prevent preferred deposition of the metal or of the formed alloy at these locations and an associated increased mechanical load on the separator.

Alternatively or additionally, the separator and spacer may be formed as one single integral piece or the separator itself may constitute the spacer. In this case, the separator has, at least on its side facing the electrode, a burled, gridded, netted, honeycombed or similar structure or a ire sponge-like or foamed structure to constitute the spacer. The invention is described in detail below with respect to exemplary embodiments with reference to the drawing.

BRIEF DESCRIPTION OF THE DRAWING

FIG. 1a shows a plan view of an embodiment of an inventive electrode in a first manufacturing step;

FIG. 1b shows a cross-section A—A of the electrode unit of FIG. 1a;

FIG. 2a shows a plan view of an embodiment of an inventive electrode in a second manufacturing step;

FIG. 2b shows a cross-section A—A of the electrode unit of FIG. 2a;

FIG. 3a shows a plan view of an embodiment of an inventive electrode in a third manufacturing step;

FIG. 3b shows a cross-section A—A of the electrode unit of FIG. 3a.

DESCRIPTION OF THE PREFERRED EMBODIMENT

Figure 4:
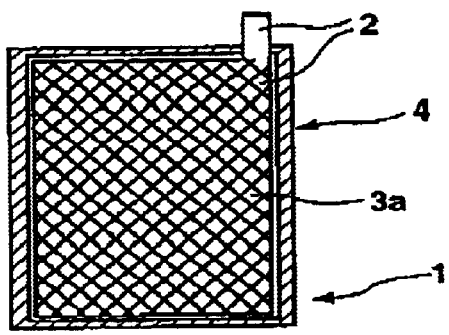
FIG. 4: shows a plan view onto an embodiment of an inventive electrode unit comprising a spacer in the shape of a fabric.

FIG. 1a, 1b show a partly finished electrode unit comprising a plate-shaped electrode 2 for rechargeable electrochemical cells which gain their energy storage properties from deposition of an element in the form of metal or an alloy. In the assembly situation shown, the electrode 2 is disposed on a spacer 3 mounted on the rear electrode surface (and covered by same) and comprising an electrically insulating frame 4 covering the outer edges of the electrode 2. The spacer 3 is disposed on a porous separator 5a of sheet-like design. In the embodiment shown, the spacer 3 has a foamy structure. In the assembly situations shown in FIGS. 2a and 2b, the front surface of the electrode is provided with a further spacer 3, including frame 4.

In the assembly situation in accordance with FIGS. 3a and 3b, a further sheet-like separator 5b is disposed on the spacer 3 including frame 4, wherein the separators 5a, 5b are connected to one another, e.g. welded, thereby forming a separator 5 designed substantially as a completely closed pocket, preferably about the entire circumference of the surface of the electrode 2. This prevents the separator 5 from being surrounded by metal depositions and prevents an electrically conducting connection between anode and cathode and thereby a short circuit.

When using the electrode 2 as cathode during charging of the accumulator cell in an electrode unit 1 of this type, the metal on the available surface of the electrode 2 which is not covered by the spacer 3, is ideally deposited in a compact form such that the volume of the entire electrode packet does not change during charging to prevent short circuits due to strong mechanical loading of the separator 5.

The spacer 3 may e.g. be disposed substantially loosely between the electrode 2 and the separator 5 or also be rigidly connected with the electrode 2 and/or the separator 5 through gluing; welding, coating or the like.

Figure 5:
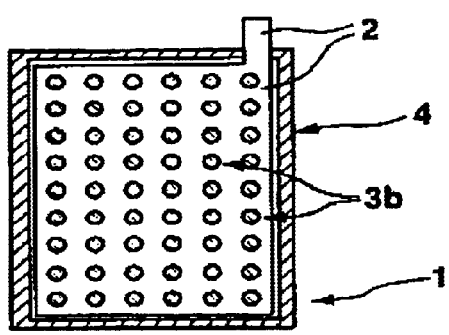
FIG. 5: shows a plan view onto an embodiment of the inventive electrode unit comprising a spacer in the shape of burls.

FIG. 4 shows a net-like spacer 3a including frame 4 and the spacer 3b of FIG. 5 has a burl-like structure. The burls may be glued e.g. onto the electrode 2 or welded on—if the spacer 3 consists of a, in particular, thermoplastic synthetic material.

Figure 6:
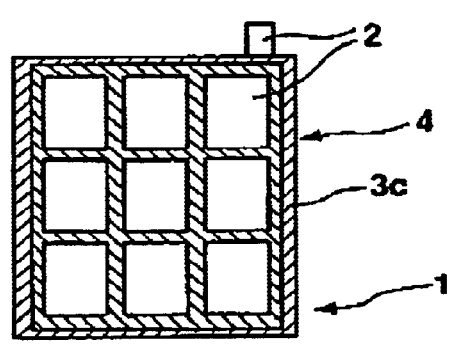
FIG. 6: shows a plan view onto an embodiment of an inventive electrode unit comprising a spacer in the shape of a grid.

FIG. 6 shows a grid-like spacer 3c including frame 4. The electrode units 1 according to FIG. 4 through 6 may also be provided with a separator (not shown) in accordance with FIGS. 3a, 3b.

Figure 7:
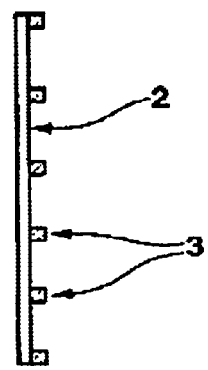
FIG. 7: shows a side view of an electrode with spacer formed as a single piece.

FIG. 7 shows a plate-like electrode 2 including an e.g. burl-like spacer 3. The electrode 2 and spacer 3 are formed as a single piece or the electrode 2 comprises a surface structure acting as spacer 3. The burls are electrically insulated by means of e.g. a coating (not shown) to prevent deposition of metal and formation of an alloy thereon.

Figure 8:
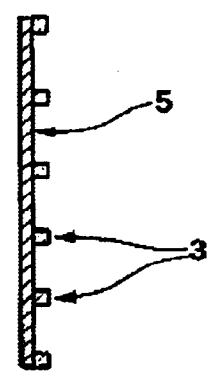
FIG. 8: shows a side view of a separator with spacer formed as a single piece.

The separator 5 in accordance with FIG. 8 is provided with the spacer 3 formed as a single piece therewith, wherein the side of the separator facing the electrode, has e.g. a burled, gridded, netted or honeycombed structure to form the spacer 3.

We claim:

1. An electrode device for rechargeable electrochemical cells which derive their energy storing properties from deposition of a metal element or alloy, the device comprising:

an electrode, said electrode having a volume which increases during a charging process through at least one of metal deposition or alloy formation;

a porous separator, said porous separator disposed to substantially surround said electrode; and an electrically insulating spacer, said spacer covering at least a portion of at least one surface of said electrode, said spacer structured to accommodate said volume increase during charging of said electrode, wherein said spacer comprises an electrically insulating frame covering said outer edges of said electrode.

2. The electrode device of claim 1, wherein said spacer is at least one of a fabric, a texture, a grid, a net or a perforated sheet.

3. The electrode device of claim 1, wherein said spacer comprises burls.

4. The electrode device of claim 1, wherein said spacer has a spongy or foamy structure.

5. The electrode device of claim 1, wherein said spacer covers between 5% and 30% of at least one surface of said electrode.

6. The electrode device of claim 1, wherein said spacer covers and electrically insulates outer edges of said electrode.

7. The electrode device of claim 1, wherein a material of said spacer is selected from the group consisting of plastic, ceramic, glassy materials and composites of these materials.

8. The electrode device of claim 1, wherein said separator is shaped like a substantially closed pocket.

9. The electrode device of claim 1, wherein said separator consists essentially of a sheet or diaphragm.

10. The electrode device of claim 1, wherein said separator comprises two substantially equally sized sheets or diaphragms which can be connected to one another about a circumference of said electrode through welding or gluing.

11. The electrode device of claim 10, wherein said sheets or diaphragms are connected to one another substantially about an entire circumference of said electrode through welding or gluing.

12. The electrode device of claim 1, wherein a material of said separator is one of plastic or synthetic thermoplastic.

13. The electrode device of claim 1, wherein said separator consists essentially of a ceramic-coated carrier material.

14. The electrode device of claim 1, wherein a material of said separator is ceramic.

15. The electrode device of claim 1, wherein said spacer is substantially loosely inserted between said electrode and said separator.

16. The electrode device of claim 1, wherein said spacer is rigidly connected to said electrode through at least one of welding, gluing or coating.

17. The electrode device of claim 1, wherein said spacer is rigidly connected with said separator through at least one of welding, gluing or coating.

18. The electrode device of claim 1, wherein said electrode and said spacer are formed as one single piece.

19. The electrode device of claim 18, wherein said spacer constitutes at least one of a burled, gridded, netted or honeycombed structure on at least an outer side of said electrode.

20. The electrode device of claim 18, wherein said spacer constitutes at least one of a spongy or foamy structure on at least an outer side of said electrode.

21. The electrode device of claim 18, wherein a surface structure of said electrode forming said spacer has an electrically insulating coating.

22. The electrode device of claim 1, wherein said separator and said spacer are formed as one single piece.

23. The electrode device of claim 22, wherein at least one side of said separator facing said electrode has at least one of a buried, gridded, netted or honeycombed structure constituting said spacer.

24. The electrode device of claim 22, wherein at least one side of said separator facing said electrode has a spongy or foamy structure.

25. A rechargeable electrochemical cell which derives its energy storing properties from deposition of an element as a metal or an alloy, the cell comprising at least one electrode device of claim 1.

* * * * *